United States Patent [19]

Sinnreich et al.

[11] 3,994,952
[45] Nov. 30, 1976

[54] ANTI-TRICYCLO[6.4.0.0.$^{2,7}$]1,4,7,10-TETRACARBOXY-2,5,8,11-TETRAHYDROXY-DODECA-4,10-DIENE AND ESTERS THEREOF, A PROCESS FOR THEIR PREPARATION, AND THEIR USE IN PREPARING LINEAR POLYESTERS

[75] Inventors: Joel Sinnreich, Bensheim, Bergstrasse, Germany; Hans Batzer, Arlesheim, Switzerland

[73] Assignee: Ciba-Geigy Corporation, Ardsley, N.Y.

[22] Filed: July 26, 1974

[21] Appl. No.: 492,088

[30] Foreign Application Priority Data
Aug. 9, 1973 Switzerland............... 11512/73

[52] U.S. Cl. .................. 260/468 G; 204/158 R; 200/75 UA; 200/514 G
[51] Int. Cl.$^2$............... C07C 61/32; C07C 69/74
[58] Field of Search............ 260/468 G, 514 G, 69

[56] References Cited
UNITED STATES PATENTS
3,483,102  12/1969  Arnold et al.................. 204/158

*Primary Examiner*—Robert Gerstl
*Attorney, Agent, or Firm*—Nestor W. Shust

[57] ABSTRACT
Compounds of formula I

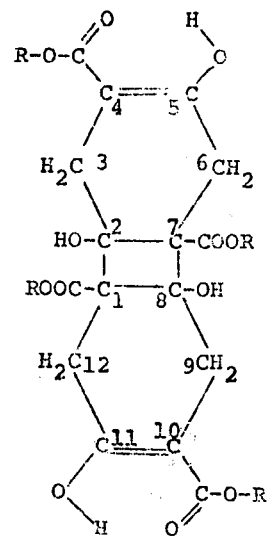

wherein R denotes hydrogen or an aliphatic or aromatic radical. These compounds are prepared by irradiation of succinylsuccinic acid or diesters thereof, in the crystalline state, with UV light rays or with γ-radiation.

4 Claims, No Drawings

ANTI-TRICYCLO[6.4.0.0.$^{2,7}$]1,4,7,10-TETRACARBOXY-2,5,8,11-TETRAHYDROXY-DODECA-4,10-DIENE AND ESTERS THEREOF, A PROCESS FOR THEIR PREPARATION, AND THEIR USE IN PREPARING LINEAR POLYESTERS

This invention relates to anti-tricyclo [6.4.0.0$^{2,7}$]1,4,7,10-tetracarboxy-2,5,8,11-tetrahydroxy-dodeca-4,10-diene and esters thereof, also to a process for the preparation of these compounds and to their use in preparing linear polyesters.

The compounds according to the invention are dimers of succinyl-succinic acid and esters thereof. It has not been hitherto possible to prepare such dimers. It was established by P. de Mayo that cyclobutanes which are formed by photochemical addition of enols to aliphatic double bonds open spontaneously (Pure and Appl. Chem. 9, 597–606, 1964). Mark et al. succeeded in obtaining a dimer of 2-hydroxy-3-methyl-cyclopent-2-enone by irradiation of a solution of the compound, whereupon a 2 + 2-cycloaddition occurred (Tetrahedron Letters No. 3, 1973, pp. 237–240). This dimer was hitherto the only one known in which the cyclobutane ring remained stable. If an attempt be made to convert a solution of succinyl-succinic acid ester by way of a thermally or actinically activated state into a cycloaddition product, the reaction fails. It was therefore surprising that the process according to the invention rendered possible the preparation of dimeric compounds.

The compounds according to the invention correspond to formula I

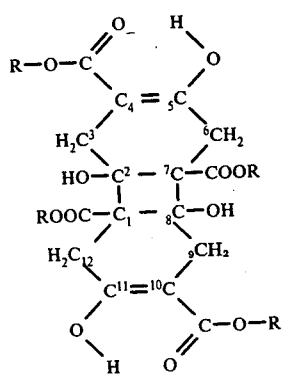

wherein
R represents hydrogen or an aliphatic or aromatic radical.

The symbol R represents in particular an alkyl group having 1 to 20, preferably 1 – 6, carbon atoms.

The process according to the invention for the preparation of compounds of formula I is characterised in that succinylsuccinic acid, or a diester thereof, of formula II

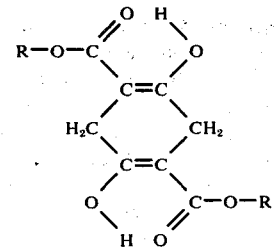

is irradiated, in the crystalline state, with UV light rays having a wavelength of 200–300 nm, or with γ-radiation.

A compound of formula II is advantageously suspended in an inert liquid permeable to the wave band of the applied radiation, e.g. in water, and the crystalline powder is irradiated. Irradiation is performed preferably with UV light rays having a wave-length of 240 to 280 nm. A $^{60}$Co-source is advantageously used for the generation of γ-rays.

The resulting dimer can be separated by Soxhlet-extraction with a solvent, e.g. with petroleum ether, from the unreacted succinylsuccinic acid or the esters thereof. After concentration of the solution by evaporation and recrystallisation, the unreacted product can be irradiated afresh and dimerised.

The dimers can be purified by recrystallisation, for which purpose a number of solvents are suitable, e.g. toluene, dioxane or ethyl acetate.

The symbol R in formula II preferably represents an alkyl group having 1 to 20 carbon atoms, especially 1 – 6 carbon atoms.

The structure of formula I has been checked by a series of tests on the tetraethyl ester (R = C$_2$H$_5$): determination of molecular weight by osmometry in the vapour phase, elementary analysis, mass spectrophotometry, NMR-spectra, IR-absorption spectra and X-ray spectrographical measurements. The melting point is between 165° and 170° C.

It is possible to synthesise from the new dimers of formula I, by condensation reactions, linear polyesters having chelate-forming and filament-forming properties. With condensation, the hydroxyl and optionally esterified carboxyl groups present on the cyclobutane grouping react. In contrast to this, the corresponding groups in the 3-, 4-, 9- and 10-position are, by virtue of the stable chelate structure, not reactive during acid catalysis.

Advantageously, the condensation reaction of the dimeric compound of formula I is performed in the melt in the presence of an acid catalyst, e.g. p-toluenesulphonic acid, with a constantly increasing vacuum being applied and the temperature being correspondingly lowered.

A further embodiment comprises the reaction of a compound of formula I with di-carboxylic acid chlorides in the molar ratio of 1:1 in the melt or in solution, whereby, with the splitting-off of hydrogen chloride, there are likewise formed linear polyesters having filament-forming properties.

With the aid of these condensation reactions, it is possible to synthesise polyesters containing, as chain members, the succinylsuccinic acid structure.

EXAMPLE 1

20 g of finely ground diethylsuccinylsuccinate is suspended in 1.5 liters of water and, by means of a circulating pump, irradiated through quartz glass through a UV-reactor, in which is located a 700 W high-pressure mercury discharge tube. After an irradiation time of in all 30 hours, the suspension is filtered, dried, and subsequently separated in the course of 12 hours, by means of Soxhlet extraction with petroleum ether (boiling range: 30°–50° C), from the starting product. The yield is 10 g of anti-tricyclo [6.4.0.0$^{2,7}$]1,4,7,10-tetraethoxycarbonyl-2,5,8,11-tetrahydroxydodeca-4,10-diene.

EXAMPLE 2

20 g of finely ground diethylsuccinylsuccinate is irradiated through a quartz glass filter with a 2000 W high-pressure mercury discharge tube. After a total irradiation time of 40 hours, during which time the mixture is continuously stirred, the mixture is separated from the starting product, as described in Example 1. The yield is 3 g of the dimer of Example 1.

Application examples

EXAMPLE I 5 g of anti-tricyclo [6.4.0.0$^{2,7}$]1,4,7,10-tetraethoxycarbonyl-2,5,8,11-tetrahydroxy-dodeca-4,10-diene is heated under argon to 165° C, and 0.5 mol-% of p-toluenesulphonic acid is added to the resulting melt. The mixture is maintained under a slight vacuum for one hour at this temperature, whereupon the same amount of catalyst is added; the temperature is lowered to 140° C and a high vacuum is applied. After a further 2 hours, solid filaments can be drawn from the melt. Average molecular weight of the polyesters obtained: over 2000 (4.6 g).

EXAMPLE II 5.12 g of anti-tricyclo [6.4.0.0$^{2,7}$]1,4,7,10-tetraethoxycarbonyl-2,5,8,11-tetrahydroxy-dodeca-4,10-diene is condensed in the melt, under a slight vacuum, with 2.39 g of sebacic acid dichloride (molar ratio 1:1). After 5 hours, solid filaments can be drawn from the melt. The resulting product is dissolved in methylene chloride and precipitated in methanol to obtain a polyester having an average molecular weight of 9,000 (2 g).

What we claim is:

1. Anti-tricyclo. [6.4.0.0$^{2,7}$]1,4,7,10-tetracarboxy-2,5,8,11,-tetrahydroxy-dodeca-4,10-diene, or esters thereof, of formula I

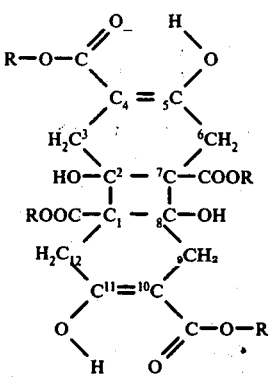

wherein
R represents hydrogen or an alkyl of 1 to 20 carbons.
2. A compound according to claim 1 wherein R represents an alkyl group having 1 to 6 carbon atoms.
3. A compound of claim 1 wherein R is hydrogen.
4. The compound of claim 1 which is anti-tricyclo [6.4.0.0$^{2,7}$]1,4,7,10-tetracarboxy-2,5,8,11-tetrahydroxy-dodeca-4,10-diene.

* * * * *